(12) United States Patent
Ohlsson et al.

(10) Patent No.: US 8,843,136 B2
(45) Date of Patent: Sep. 23, 2014

(54) SYSTEM AND METHOD FOR PERFORMING TIMING UPDATES IN A MOBILE DEVICE

(75) Inventors: Jonas Ohlsson, Malmo (SE); Simon Hultgren, Malmo (SE); Olof Torstensson, Malmo (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 962 days.

(21) Appl. No.: 12/141,589

(22) Filed: Jun. 18, 2008

(65) Prior Publication Data
US 2009/0227257 A1    Sep. 10, 2009

Related U.S. Application Data

(60) Provisional application No. 61/035,117, filed on Mar. 10, 2008, provisional application No. 61/036,177, filed on Mar. 13, 2008.

(51) Int. Cl.
*H04W 36/18* (2009.01)
*H04W 56/00* (2009.01)
*H04W 48/20* (2009.01)
*H04B 7/26* (2006.01)

(52) U.S. Cl.
CPC .......... *H04B 7/2684* (2013.01); *H04W 56/0045* (2013.01); *H04W 36/18* (2013.01)
USPC ........... 455/442; 455/502; 455/503; 375/354; 375/355; 375/356; 375/357

(58) Field of Classification Search
CPC ... H04W 36/18; H04W 56/00; H04W 56/004; H04W 56/0045; H04W 48/20; H04W 52/0216; H04W 8/26; H04B 7/2684; H04J 13/16; H04J 3/0658; H04J 3/0664; H04J 3/0632
USPC ........................................................ 455/442
See application file for complete search history.

(56) References Cited

U.S. PATENT DOCUMENTS

| | | | |
|---|---|---|---|
| 5,640,679 A * | 6/1997 | Lundqvist et al. | 455/525 |
| 6,560,215 B1 | 5/2003 | Bloem et al. | |
| 6,657,988 B2 * | 12/2003 | Toskala et al. | 370/350 |
| 6,822,969 B2 * | 11/2004 | Love et al. | 370/444 |
| 6,873,612 B1 * | 3/2005 | Steer et al. | 370/342 |
| 7,269,421 B2 | 9/2007 | Palenius et al. | |

(Continued)

FOREIGN PATENT DOCUMENTS

WO      WO 03/007506 A      1/2003

*Primary Examiner* — Lester Kincaid
*Assistant Examiner* — Diego Herrera

(57) ABSTRACT

In a mobile communications network, drifts in timing of user equipment in soft handover may be accounted for by measuring the offset between the current timing of the user equipment and the first significant path of downlink frames from cells of the active set at first and second instances. Differences in the respective offsets from the first and second instances may be calculated to determine if the drift is unidirectional in time for all cells of the active set. A unidirectional drift in the offsets is indicative of a drift in timing of the user equipment, allowing the current timing to be momentarily unfrozen and updated.

20 Claims, 7 Drawing Sheets

(56) References Cited

U.S. PATENT DOCUMENTS

| | | |
|---|---|---|
| 7,447,179 B2 * | 11/2008 | Lu .................................. 370/335 |
| 7,853,215 B2 | 12/2010 | Kurek et al. |
| 2002/0045451 A1 * | 4/2002 | Hwang et al. ................. 455/442 |
| 2002/0049057 A1 * | 4/2002 | Moulsley et al. ............. 455/436 |
| 2003/0002470 A1 * | 1/2003 | Park et al. ...................... 370/342 |
| 2003/0007470 A1 | 1/2003 | Grilli et al. |
| 2006/0063556 A1 | 3/2006 | Palenius et al. |
| 2006/0285521 A1 | 12/2006 | Steudle |

* cited by examiner

SYSTEM AND METHOD FOR PERFORMING TIMING UPDATES IN A MOBILE DEVICE

CROSS-REFERENCE TO RELATED APPLICATIONS

This application claims the benefit of U.S. Provisional Application Nos. 61/035,117 and 61/036177 filed Mar. 10, 2008 and Mar. 13, 2008, respectively, the disclosures of which are incorporated by reference herein.

TECHNICAL FIELD

The present invention relates to mobile communications systems. More particularly, and not by way of limitation, the present invention is directed to updating timing of user equipment during a soft handover.

BACKGROUND

In the Universal Mobile Telephony System (UMTS), defined by the standards published by the 3rd Generation Partnership Project (3GPP), a mobile device, or user equipment UE, can establish links with several cells in the cellular radio network.

The data received by the user equipment from each of the cells is transmitted in frames on respective downlink channels. The frames in the respective downlink channels are not completely synchronized with each other. Moreover, because of possible movement of the user equipment relative to the base stations in the different cells, the timing of each downlink frame, relative to the other received downlink frames, can change.

The user equipment transmits data in frames on the uplink to the base stations in the cells with which the user equipment has links. Thus, there is defined for the user equipment a transmission frame timing, which is common to all of the uplink channels. This transmission frame timing is defined with reference to the downlink frame timing of one of the active links, termed the reference cell.

Furthermore, there is defined a receiver window relative to the transmission frame timing. The user equipment is able to receive information from any base station system whose downlink transmission falls within the defined receiver window. The receiver window is defined in the 3GPP technical specification TS 25.133 as T+/−148 chip before the transmit timing. The base station systems with which the user equipment has active radio links are defined as the active set. In use, for example as the user equipment drifts further from or nearer to particular base station systems, some radio links may be lost, and new radio links may be set up. The reference cell against which the transmission frame timing is defined can be removed from the active set, at which time a new reference cell can be defined. If the active set comprises more than one cell which have downlink frame timing inside the receiving window of the user equipment, the user equipment is in soft handover or softer handover.

A user equipment can be in soft handover for long periods of time in CDMA based mobile communication systems. If the timing is simply updated towards a reference cell, when a plurality of cells exist, the user equipment may push one or more cells outside the receiver window. Also, when a plurality of cells exists, selecting a new reference cell to update timing towards could cause unnecessary large adjustments of the transmit timing. Large adjustments are undesirable as they could cause performance degradation both for the user equipment and the network.

Drifts in the timing may also occur when the user equipment is stationary. A slow drift takes place even when the user equipment is stationary since there is a small frequency difference between the clocking of the base station and the user equipment. If the timing is simply frozen while the drift continues, the user equipment will eventually lose sync with the cells in the active set when the paths from all cells have drifted out of the receiver window. This problem can be visible in a stationary long duration connection in soft handover if the reference timing is frozen.

It would be advantageous to have a system and method for updating user equipment timing that overcomes such disadvantages and limitations.

SUMMARY

The present invention is directed to updating timing of user equipment during a soft handover.

In one aspect, the present invention is directed to a method for operating user equipment in a mobile communications network. In the method, a drift of a current timing of the user equipment relative to each cell of an active set of cells is determined and the current timing is updated if a direction of the drift is in a same direction for each cell of the active set of cells.

In another aspect, the present invention is directed to user equipment for use on a mobile telecommunications network. The user equipment comprises circuitry configured to determine a timing drift of a current timing of the user equipment relative to each cell of an active set of cells, and update the current timing of the user equipment if a direction of the drift is in a same direction for each cell of said active set of cells.

BRIEF DESCRIPTION OF THE SEVERAL VIEWS OF THE DRAWING

In the following section, the invention will be described with reference to exemplary embodiments illustrated in the figures, in which.

DETAILED DESCRIPTION

Figure 1:
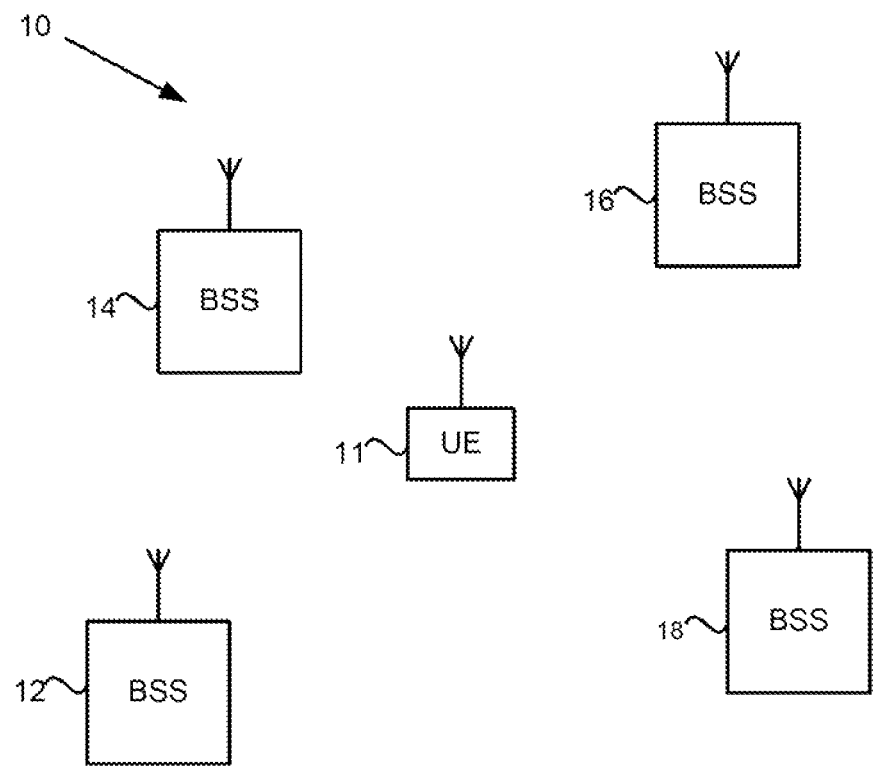
FIG. 1 is a schematic representation of a part of a mobile communications network.

FIG. 1 illustrates a part of a mobile communications network 10 in accordance with the present invention. Specifically, FIG. 1 shows a user equipment (UE) 11, which is moveable within a network of base station systems (BSS) 12, 14, 16, 18. The base station systems (BSS) 12, 14, 16, 18 have respective overlapping coverage areas, or cells. It will be understood by the person skilled in the art that the network 10 may contain more or less base station systems than the four shown in FIG. 1. Each of the base station systems 12, 14, 16, 18 has a respective connection (not shown in FIG. 1) to a data communications network.

The embodiments are described herein with reference to, but not limited to, the Universal Mobile Telephony Service (UMTS), as defined by the 3rd Generation Partnership Project (3GPP). In such a system, the user equipment 11 may have active radio links with more than one base station system. The base station systems with which the user equipment has active radio links are defined as the active set. In use, for example as the user equipment moves further from or nearer to particular base station systems, some radio links may be lost, and new radio links may be set up.

Figure 2:
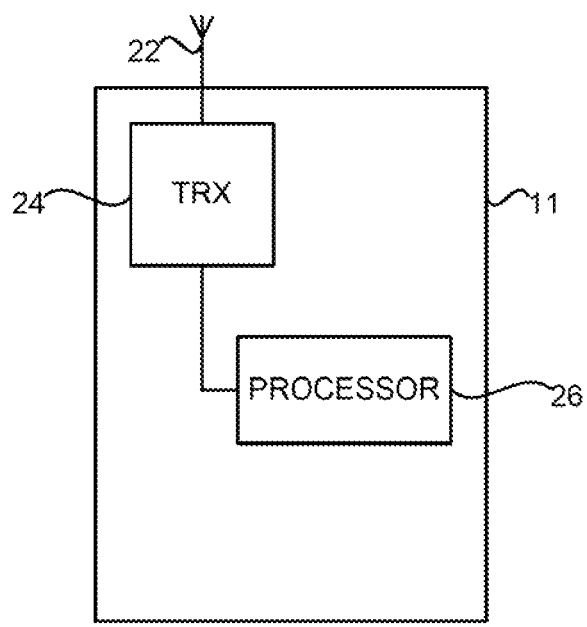
FIG. 2 is a block schematic diagram of a mobile communications device.

FIG. 2 is a schematic diagram of the relevant parts of the user equipment 11. It will be apparent that the user equipment 11 has many other features and functions which are not described herein, as they are not essential for an understanding of the present invention. The user equipment 11 takes the form of portable radio communication equipment, which may for example be a mobile telephone, personal digital assistant (PDA) with wireless communication facility, wireless modem and the like. The user equipment 11 has an antenna 22, which receives and transmits signals over the air interface to one or more of the base station systems in the network. Received signals are passed to transceiver (TRX) circuitry 24, and then to a processor 26. Conversely, signals for transmission are passed from the processor 26 to the transceiver circuitry 24, and then to the antenna 22.

The processor 26 is responsible for separating the wanted signals out from all of the received radio signals, and is also responsible for receiving the data which is to be transmitted, and converting it into a form which is suitable for transmission over the air interface.

Figure 3:
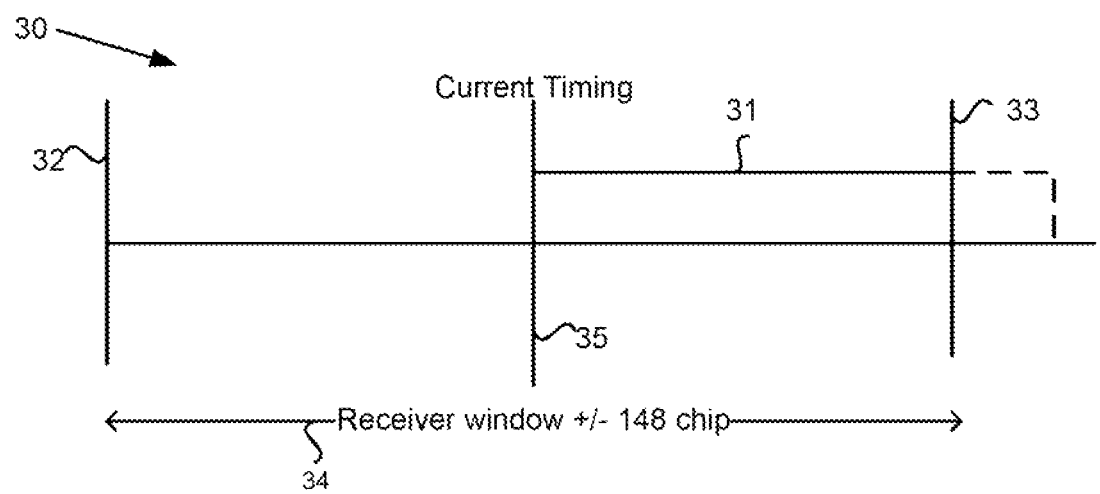
FIG. 3 is a timing diagram showing how the current timing of user equipment may be defined.

FIG. 3 shows a timing diagram 30 in a situation when the user equipment 11 has one active radio link. In that case, the user equipment 11 uses the first significant path of a downlink frame 31 on the active link to set a current timing 35 of the user equipment. The active radio link to which the current timing is set becomes the reference cell. The current timing 35 defines a receiver window 34, which extends a fixed time (for example 148 chips) before 32 and after 33 the received radio link timing. Other radio links can only be received if their respective received radio link timings are within this receiver window. If two or more radio links are received at the same time, the user equipment is in soft handover.

Drifts in timing of user equipment in soft handover may be accounted for by measuring the offset between the current timing of the user equipment and the first significant path of downlink frames from cells of the active set at first and second instances. Differences in the respective offsets from the first and second instances may be calculated to determine if the drift is unidirectional in time for all cells of the active set. A unidirectional drift in the offsets is indicative of a drift in timing of the user equipment, allowing the current timing to be momentarily unfrozen and updated.

Figure 4A:
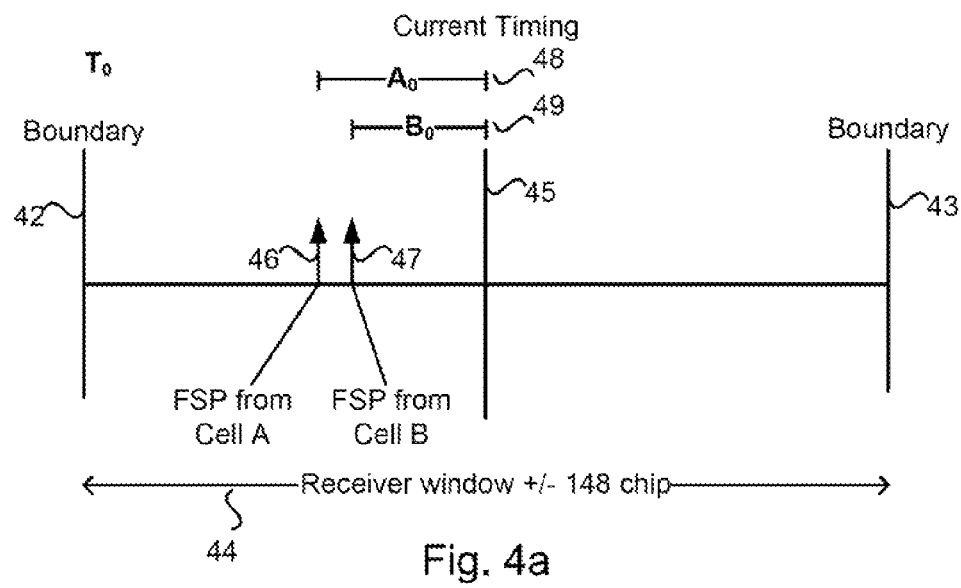
FIG. 4 is a timing diagram showing determining offsets between the current timing and the first significant paths of active cells.
Figure 4B:
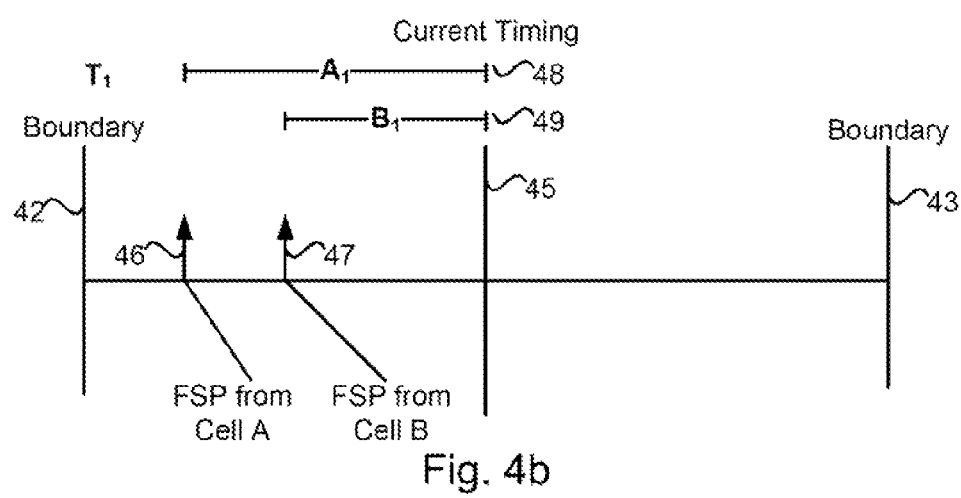

FIG. 4(*a*) shows a situation where user equipment 11, which is in soft handover, has current timing 45 that defines a receiver window 44 having boundaries 42, 43. At the instance $T_0$ shown, the active set consists of two cells, Cell A and Cell B.

In accordance with an embodiment of the invention, the offset between the current timing and the First Significant Path (FSP) 46, 47 of each cell is calculated regularly. At the instance $T_0$ of FIG. 4(*a*), the offsets 48, 49 of Cell A and Cell B are $A_0$ and $B_0$ respectively. At a later instance $T_1$ shown in FIG. 4(*b*), the offsets 48, 49 of Cell A and Cell B are calculated as $A_1$ and $B_1$ respectively.

The size of a temporal drift can be calculated from a comparison of the $T_1$ and $T_0$ offsets for each cell, which can be represented as $(A_1-A_0)$ and $(B_1-B_0)$. The direction of the drift can be given by the sign of the calculation. The term direction as used herein describes a temporal direction, e.g. forward or backward of the current timing, and does not refer to spatial aspects. In the example of FIG. 4, the Cell A and Cell B offsets both drifted backward, i.e. to the left, of the current timing and so have the same sign. Such unidirectional drifts are most indicative of timing drifts within a stationary user equipment, rather than a positional change of the user equipment which tends to yield drifts both forwards and backwards depending on the relative proximity change between the user equipment and the respective cell.

Figure 4C:
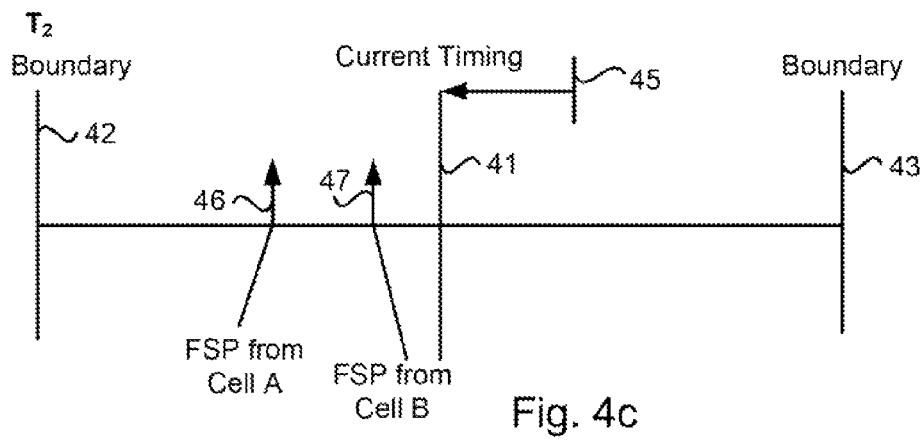

Irrespective of the cause of the drift, if left unchecked it is likely that the cells will be lost from the receiver window. Accordingly, if all of the cells in the active set have drifted in the same direction as indicated in FIG. 4, the current timing may be momentarily unfrozen and updated, thereby ensuring that the cells of the active set remain in the receiver window. FIG. 4*c* shows the situation at time $T_2$ after updating the current timing. The current timing has been updated backward from its initial timing 45 to a final timing 41. As a result of the timing update, the radio links 46, 47 are more safely received within the boundaries 42, 43 of the receiver window. The timing may not be updated at a rate higher than the maximum rate specified by the standard, for example the 3GPP standard.

Figure 8:
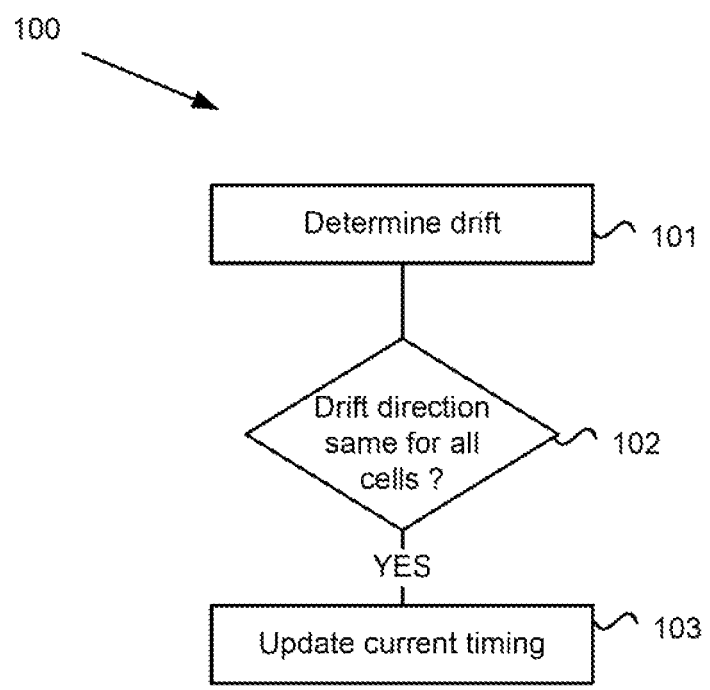
FIG. 8 depicts a method for operating user equipment in accordance with an embodiment of the disclosure.

A method for operating the user equipment 11 in the mobile communications network 10 will now be described with reference to FIGS. 1 to 4 and the flowchart 100 of FIG. 8. The user equipment is assumed to be operating in soft handover and without a reference cell to which timing may be updated. That is, a reference cell against which the current timing is defined is either lost, has been dropped from the active set or is for any other reason not defined. The active set of cells, e.g. 12, 14, 16, 18 etc is defined for the user equipment 11. At step 101, a drift of the current timing is determined relative to each cell of the active set of cells, e.g. cells 12, 14, 16, 18 etc. If a direction of the drift is the same for each cell in the active set of cells (step 102), the current timing is updated at step 103.

The updating of the current timing may be triggered in a variety of ways. In one embodiment, the current timing may be updated if the drift of each cell is determined to be in the same direction, as shown in FIG. 4. In alternative embodiments, a condition relative to a threshold may be defined such that the updating is performed dependent on whether the condition is satisfied.

Figure 5A:
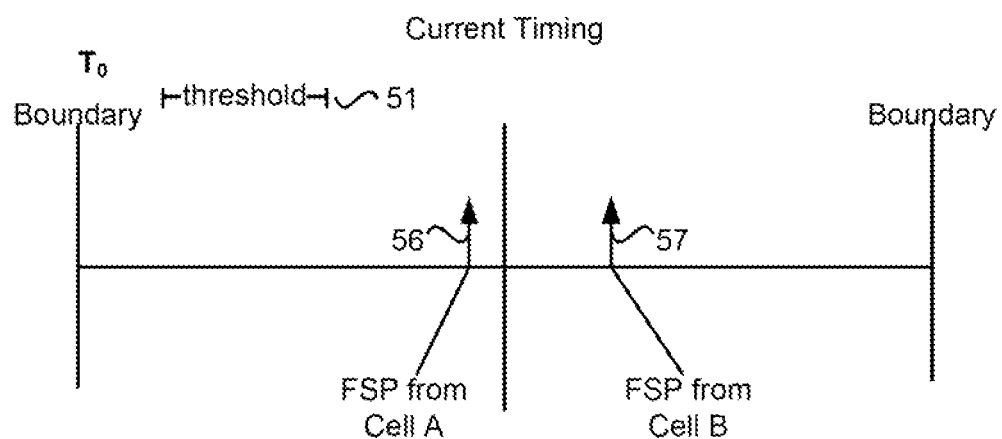
FIG. 5 is a timing diagram showing triggering a timing update in accordance with an embodiment of the disclosure.
Figure 5B:
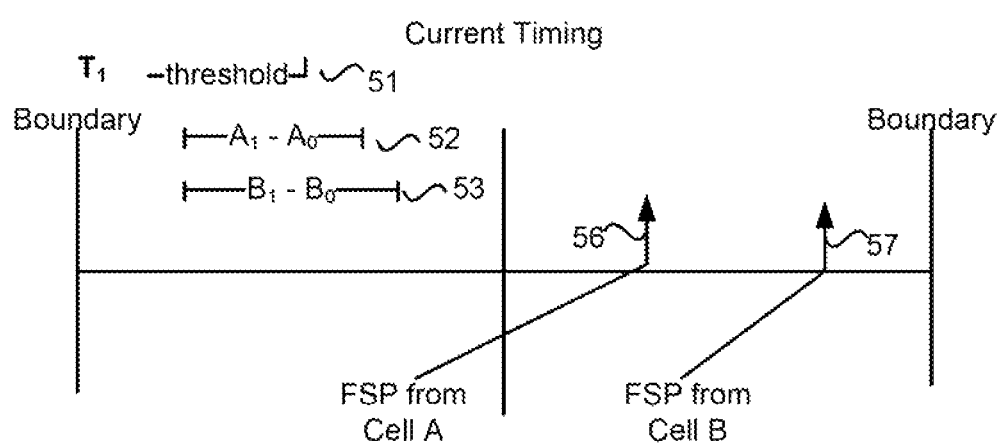

In FIG. 5, there is illustrated an embodiment in which the current timing is updated if all cells in the active set have drifted in the same direction by more than a threshold amount 51. FIGS. 5(*a*) and 5(*b*) show the offsets from the first significant path 56 of Cell A and the first significant path 57 of Cell B at times $T_0$ and $T_1$ respectively. The shift in the offset for Cell A $(A_1-A_0)$ 52 and for Cell B $(B_1-B_0)$ 53 is more than a threshold amount 51, thus triggering the updating of the current timing. In this embodiment, the updating is dependent only on the size of the unidirectional drift of the offset and performed irrespective of whether the FSPs of the cells are forward or backward of the current timing.

Figure 6A:
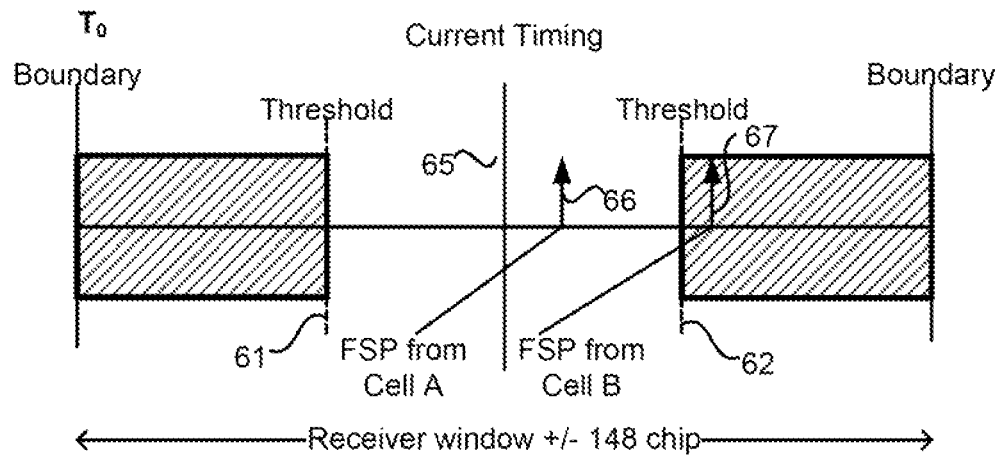
FIG. 6 is a timing diagram showing triggering a timing update in accordance with a further embodiment of the disclosure.
Figure 6B:
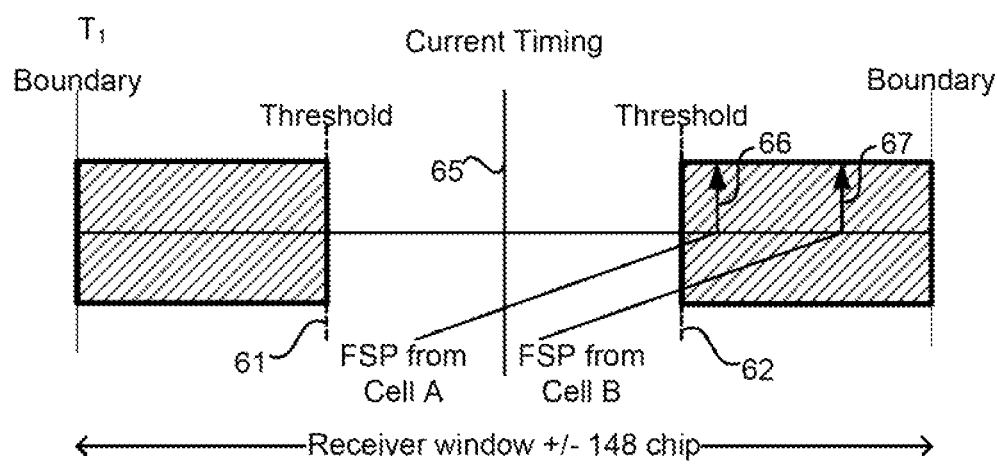

In one embodiment illustrated in FIG. 6, thresholds 61, 62 are defined either side of the current timing. In this embodiment, the current timing is updated if the offsets show that all cells in the active set have drifted far enough to the left 61 or to the right 62 of the current timing and thus fall outside of the period between the current timing 65 and the respective thresholds 61, 62. In FIG. 6(*a*), at time $T_0$, the offset of Cell B is outside of the threshold 62 but the offset of Cell A is within the threshold. However, at time $T_1$, Cell A and Cell B have both drifted such that the FSP of Cell A also occurs outside of the threshold 62, thereby triggering updating of the current timing, for example redefining the reference cell.

Figure 7A:
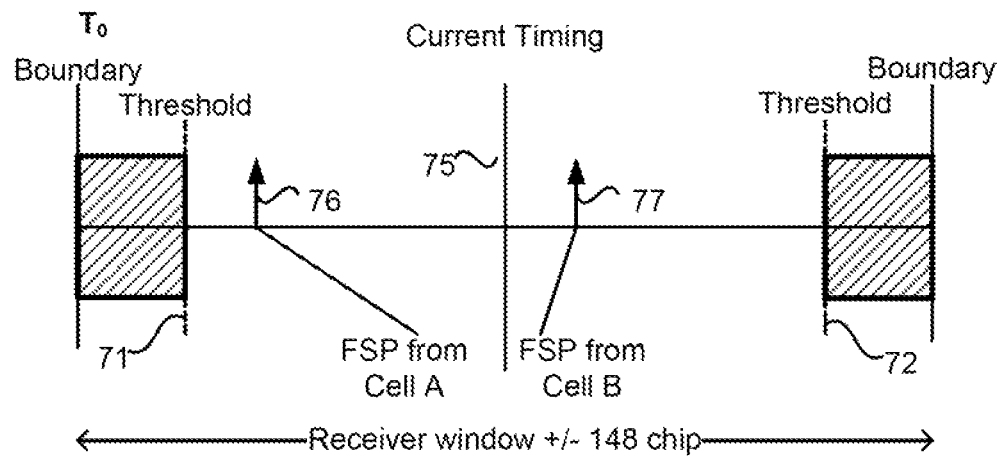
FIG. 7 is a timing diagram showing triggering a timing update in accordance with a further embodiment of the disclosure.
Figure 7B:
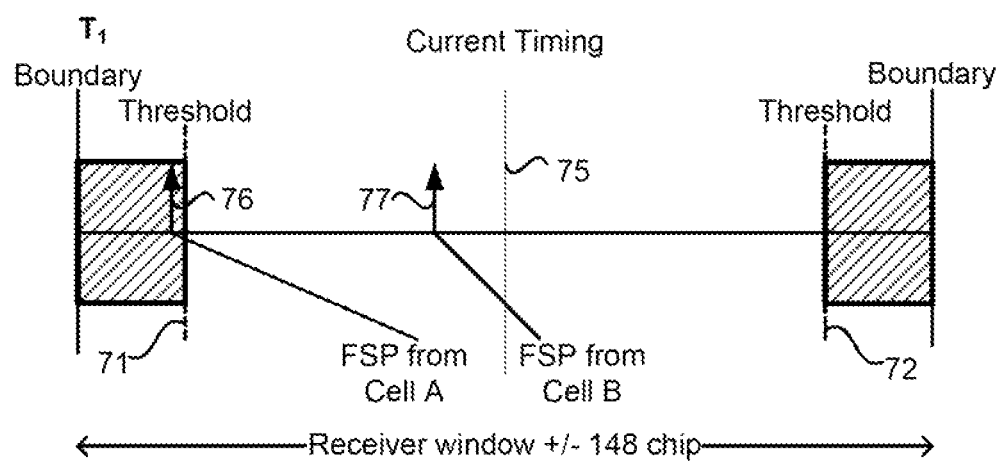

In one embodiment illustrated in FIG. 7, boundary thresholds 71, 72 may be defined near the boundaries of the receiver window. In this embodiment, the current timing 75 is updated if the unidirectional drifts in the offsets lead to any of the cells falling outside of the boundary threshold. In FIG. 7(*a*), at time $T_0$, the offsets of Cell A and Cell B are within the boundary thresholds 71, 72. At time $T_1$, the difference in the offsets indicate that both Cell A and Cell B have drifted to the left, with the FSP of Cell A 76 now occurring outside of the boundary threshold 71, thereby triggering updating of the timing.

While embodiments for triggering the updating of the current timing have been described individually, it will be apparent to a person skilled in the art that combinations of the methods are possible. For example, the embodiments of FIGS. 6 and 7 may be combined by defining two sets of thresholds, one threshold for all cells and one threshold for a single cell, i.e. a boundary threshold. Updating of the current timing may be performed if all cells have drifted unidirectionally so that either all cells have drifted outside of the "all cells" threshold or one cell has drifted outside of the boundary threshold.

In one embodiment, redefining the current radio link timing may be by defining a common drift direction. In one embodiment, redefining the current timing may be by redefining the reference cell. In one embodiment, redefining the current timing may be by defining a virtual reference cell as described in the Applicant's previous patent U.S. Pat. No. 7,269,421 the contents of which are incorporated herein by reference. In one embodiment, the current timing may be updated by an amount equal to an average timing drift of all cells in the active set. In one embodiment, the current timing may be updated by an amount equal to the minimum timing drift measured across all cells of the active set. Updating the current timing by the minimum drift prevents any cells of the active set from being inadvertently pushed outside of the receiver window. The timing updates should follow any particular constraints of the standard.

As described above, the user equipment 11 includes circuitry including TRX circuitry 24 and at least one processor 26. In one embodiment the circuitry of the user equipment 11 is configured to determine a timing drift of one or more of the active cells relative to the user equipment and to update the timing of the user equipment if significant timing drift across the active cells is determined.

Advantages of the above described embodiments includes that the user equipment updates its timing in soft handover in such a way that the complete active set of cells is not pushed outside the receiver window while also reducing the number of timing updates required.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. A method for operating user equipment in a mobile communications network in which the user equipment has a current timing and radio links with a plurality of cells, and in which the cells with which the user equipment has radio links define an active set, the method comprising:
   determining a timing drift and direction of said current timing relative to each cell of said active set of cells; and
   updating said current timing in response to determining a direction of said drift is in a same direction for each cell of said active set of cells.

2. The method according to claim 1 wherein updating said current timing comprises redefining a reference cell.

3. The method according to claim 1 wherein updating said current timing comprises updating the current timing by an amount equal to an average timing drift of all cells of said active set of cells.

4. The method according to claim 1 wherein updating said current timing comprises updating the current timing by an amount equal to a minimum timing drift of all cells of said active set of cells.

5. The method according to claim 1 further comprising:
   defining at least one threshold;
   determining at least one condition relative to said at least one threshold; and
   updating said current timing dependent on said at least one condition.

6. The method according to claim 5 wherein said threshold comprises an amount of drift and wherein said condition comprises that each cell of said active set of cells has drifted in the same direction by more than said threshold amount of drift.

7. The method according to claim 5 wherein said threshold defines a time between said current timing and a boundary of a receiver window and wherein said condition comprises that each cell of said active set of cells has drifted into a period between said threshold and said boundary.

8. The method according to claim 5 wherein said threshold defines a time between said current timing and a boundary of a receiver window and wherein said condition comprises that at least one cell of said active set of cells has drifted into a period between said threshold and said boundary.

9. The method according to claim 5 comprising:
   defining at least two thresholds in a period forward of said current timing or in a period backward of said current timing; and
   defining at least two conditions in respect of said at least two thresholds.

10. The method according to claim 1 wherein for each active cell, the user equipment receives a First Significant Path from the respective cell within a receiver window, wherein determining a timing drift of said current timing comprises:
    for each cell of said active set of cells, determining an offset between the respective First Significant Path and the current timing at a first instance;
    for each cell of said active set of cells, determining an offset between the respective First Significant Path and the current timing at a second instance;
    for each cell of said active set of cells, determining a difference between the offsets at the first and second instance.

11. The method according to claim 10 comprising determining a sign of the difference between the offsets, wherein said current timing is updated if the sign of the difference of each cell of the active set of cells is the same.

12. The method according to claim 10 comprising determining a sign of the difference between the offsets, wherein said current timing is updated if the sign of the difference of each cell of the active set of cells is the same and the amount of the difference between the offsets of each cell of the active set of cells is greater than a predetermined amount.

13. The method according to claim 10 comprising determining a sign of the difference between the offsets, wherein said current timing is updated if the sign of the difference of each cell of the active set of cells is the same and the amount of the difference between the offsets of at least one cell of the active set of cells is greater than a predetermined amount.

14. The method according to claim 10 further comprising:
    defining a threshold between a boundary of the receiver window and the current timing;
    wherein the current timing is updated if at said second instance the First Significant Path of each active cell is received within a period between a boundary of the receiver window and said threshold.

15. The method according to claim 14 wherein said threshold is at a predetermined time forward or a predetermined time backward of said current timing.

16. The method according to claim 14 wherein the current timing is updated if at said first instance the First Significant Path of at least one active cell is received in said receiver window in a period outside of said period between said boundary and said threshold.

17. User equipment for use on a mobile telecommunications network, the user equipment having a current timing and radio links with a plurality of cells, in which the cells with which the user equipment has radio links define an active set, the user equipment comprising circuitry configured to:
    determine a timing drift and direction of said current timing relative to each cell of said active set of cells; and
    update the current timing of the user equipment in response to determining a direction of said drift is in a same direction for each cell of said active set of cells.

18. The user equipment according to claim 17 wherein said circuitry is configured to update said current timing by an amount equal to an average timing drift of all cells of said active set of cells.

19. The user equipment according to claim 17 wherein said circuitry is configured to update said current timing by an amount equal to a minimum timing drift of all cells of said active set of cells.

20. The user equipment according to claim 18 wherein said circuitry is configured to define at least one threshold, determine at least one condition relative to said at least one threshold, and update said current timing dependent on said at least one condition.

* * * * *